US012732090B2

(12) United States Patent
Krabbenborg et al.

(10) Patent No.: US 12,732,090 B2
(45) Date of Patent: Sep. 8, 2026

(54) CONTROL CIRCUIT FOR A BOOST CONVERTER IN DCM

(71) Applicant: GOODIX TECHNOLOGY (HK) COMPANY LIMITED, Hong Kong (CN)

(72) Inventors: Bernardus Henricus Krabbenborg, Nijmegen (NL); Jokin Segundo Babarro, Borne (NL); Marco Berkhout, Nijmegen (NL)

(73) Assignee: GOODIX TECHNOLOGY (HK) COMPANY LIMITED, Hong Kong (CN)

( * ) Notice: Subject to any disclaimer, the term of this patent is extended or adjusted under 35 U.S.C. 154(b) by 184 days.

(21) Appl. No.: 18/616,586

(22) Filed: Mar. 26, 2024

(65) Prior Publication Data

US 2024/0235367 A1 Jul. 11, 2024

Related U.S. Application Data

(63) Continuation of application No. PCT/CN2022/138400, filed on Dec. 12, 2022.

(30) Foreign Application Priority Data

Dec. 17, 2021 (EP) .................................... 21215690

(51) Int. Cl.
*H02M 3/158* (2006.01)
*H02M 1/00* (2006.01)
*H02M 1/08* (2006.01)

(52) U.S. Cl.
CPC .......... *H02M 1/08* (2013.01); *H02M 1/0025* (2021.05); *H02M 3/158* (2013.01)

(58) Field of Classification Search
CPC .......... H04B 2215/069; H02M 3/156; H02M 3/158; H02M 3/1588; H02M 3/155;
(Continued)

(56) References Cited

U.S. PATENT DOCUMENTS 7,443,148 B2 10/2008 Weng
9,742,268 B2 8/2017 Wang
(Continued)

FOREIGN PATENT DOCUMENTS

CN 104953836 A 9/2015
CN 105281556 A 1/2016
(Continued)

OTHER PUBLICATIONS

International Search Report dated Mar. 7, 2023 issued in PCT/CN2022/138400.

(Continued)

*Primary Examiner* — Bryan R Perez
(74) *Attorney, Agent, or Firm* — Scully, Scott, Murphy & Presser, P.C.

(57) ABSTRACT

A control circuit for a boost converter wherein the control circuit comprises switching means configured to switch the boost converter to perform cycles wherein each cycle comprises an energy charging state in which an inductor stores energy provided by an input voltage and an energy discharging state in which the inductor provides energy to an output of the boost converter, comparison means configured to decide whether a frequency of a switching event is lower than a predetermined minimum frequency and on-time signal generation means configured to generate an on-time signal based on whether a frequency of a switching event is lower than a predetermined minimum frequency, wherein the on-time signal determines a duration of a charging state of a next switching event and wherein the switching means (Continued)

is configured to switch the boost converter based on the generated on-time signal.

20 Claims, 17 Drawing Sheets

(58) Field of Classification Search
CPC .. H02M 3/1582; H02M 3/157; H02M 3/1563; H02M 3/1584; H02M 1/32; H02M 1/081–084; H02M 1/0006
See application file for complete search history.

(56) References Cited

U.S. PATENT DOCUMENTS

| | | | | |
|---|---|---|---|---|
| 10,284,100 | B2 | 5/2019 | Djenguerian et al. | |
| 10,958,171 | B2 | 3/2021 | Vadnerkar et al. | |
| 2005/0146908 | A1 | 7/2005 | Feldtkeller | |
| 2008/0088284 | A1 | 4/2008 | Weng | |
| 2008/0252278 | A1 | 10/2008 | Lindeberg et al. | |
| 2013/0033248 | A1 | 2/2013 | Granger | |
| 2016/0268907 | A1 | 9/2016 | Chen | |
| 2017/0005575 | A1 | 1/2017 | Wang | |
| 2018/0337601 | A1 | 11/2018 | Vadnerkar et al. | |
| 2018/0342956 | A1 | 11/2018 | Djenguerian et al. | |
| 2021/0242774 | A1 | 8/2021 | Yun et al. | |
| 2021/0351685 | A1* | 11/2021 | Sundararaj | H02M 1/007 |

FOREIGN PATENT DOCUMENTS

| | | | |
|---|---|---|---|
| CN | 110945767 | A | 3/2020 |
| CN | 111711361 | A | 9/2020 |
| CN | 113271011 | A | 8/2021 |
| CN | 114744859 | A | 7/2022 |
| GB | 2426836 | A | 12/2006 |
| WO | 2017156075 | A1 | 9/2017 |

OTHER PUBLICATIONS

Xu, Xiaoru et al., “A quasi fixed frequency constant on time controlled boost converter,” 2008 IEEE International Symposium on Circuits and Systems (ISCAS), Seattle, WA, USA, 2008, pp. 2206-2209, doi: 10.1109/ISCAS.2008.4541890.
Causes of acoustic noise in power inductors—https://product.tdk.com/en/techlibrary/solutionguide/acoustic-noise.html, Printed on Mar. 15, 2024.
TFA9878, High Efficiency Class-D Audio Amplifier, datasheet, Goodix Technologies.
LMR70503 Simple Switcher® Buck-Boost Converter for Negative Output Voltage in µSMD.
Hanhart, Michael et al., “An integrated Boost Controller with MPPT for Submodule PV Applications,” ESSCIRC 2021—IEEE 47th European Solid State Circuits Conference (ESSCIRC), Grenoble, France, 2021, pp. 231-234, doi: 10.1109/ESSCIRC53450.2021.9567804.

* cited by examiner $I_{COIL}$ $I_{COIL}$ $T_{ON}$ $I_{COIL\ AVERAGE}$ time $V_{REF}$
$T_{ON}$
$V_C$
0
time 1
start
0
time 1
ready
0
time 1
$S_L$
0
time 1
reset, $S_H$
0
time $I_{COIL}$
time
$T_{BST} = 1 / f_{BST}$
402
$T_{ON}$
400
$T_{ON}$
400
490 clock count $I_{COIL}$
0
702
704
start counting
stop counting, process result
start counting, adjusted $T_{ON}$
time
time
time
$T_{ON}$
$T_{BST}=1/f_{BST}$
$T'_{ON}$
$T'_{BST}=1/f'_{BST}$

Fig. 7D $I_{COIL}$

0

$T_{BST} = 1 / f_{BST}$ $T_{ON}$

704

702

702

702

704 time 902
measure $f_{BST}$, reset counter
904
$f_{BST} < f_{MIN}$
Y
N
906
$N_{SET} = N_{SET} + 1$
916
$f_{BST} > f_{MAX}$
Y
N
918
$N_{SET} = 0$
920
$f_{BST} > f_{MID}$
Y
N
922
$N_{SET} = N_{SET} - 1$
908
wait for next switching event
910
start counting
912
wait for next switching event

Fig. 10

$f_{MAX}$ $f_{MID}$ $f_{MIN}$ $f_{BST}$ $N_{SET}$ 7 6 5 4 3 2 1 0

$I_{LOAD}$

V_BST

I_LOAD
0 f_MAX
f_MID
f_BST
f_MIN
0

I_COIL

N_SET
0
1
2
3
4
5
6
7 count
time $V_{BST}$ $I_{LOAD}$
0

$f_{MAX}$
$f_{MID}$
$f_{BST}$
$f_{MIN}$
0

$I_{COIL}$ $N_{SET}$
2
3 count
time $V_{BST}$ $I_{LOAD}$
0

$f_{MAX}$
$f_{MID}$
$f_{MIN}$
$f_{BST}$
0

$I_{COIL}$ $N_{SET}$
7
6
5
4
3
2
0 count
time $V_{BST}$ $I_{LOAD}$
0

$f_{MAX}$
$f_{MID}$
$f_{BST}$
$f_{MIN}$
0

$I_{COIL}$ $N_{SET}$
3
2 count
time

V_BST

I_LOAD
0 f_BST
f_MID
f_MIN
0

I_COIL

N_SET
1
2
3
4
5
0
1 count
time

CONTROL CIRCUIT FOR A BOOST CONVERTER IN DCM

CROSS-REFERENCE TO RELATED APPLICATIONS

This application is a continuation of International Application No. PCT/CN2022/138400, filed on Dec. 12, 2022, which claims priority to EPO Patent Application No. 21215690.5, entitled "Control circuit for a boost converter in DCM" and filed on Dec. 17, 2021. The disclosures of the aforementioned applications are hereby incorporated by reference in their entireties.

TECHNICAL FIELD

The disclosures relate to a control circuit for a boost converter. The disclosures further relate to a boost converter circuit comprising said control circuit and to a method of operating said boost converter circuit comprising said control circuit.

BACKGROUND

Energy harvesting is the process by which energy is derived from external sources, captured, and stored for small, wireless autonomous devices, like those used in wearable electronics and wireless sensor networks. A direct current to direct current 'DC-to-DC' converter circuits, such as boost converter circuits, are electronic circuits that convert a source of direct current (DC) from one voltage level to another voltage by first charging an energy storage element using an input voltage and then discharging the energy storage element to provide the energy at the output of the DC-to-DC converter. DC-to-DC converters can be used to increase the amount of energy harvested from an energy source. Constant-On-Time (COT) boost converters are popular for its simplicity and high performance. When working in discontinuous conduction mode (DCM), if the switching frequency of the boost converter drops below a certain frequency, it could cause an audible noise, or cause distortion by interfering with the audio signal patch on chip.

This problem could be avoided by using only continuous conduction mode (CCM) so that the boost converter keeps switching. However, this solution leads to higher energy dissipation and therefore lower efficiency for low loads.

Alternatively, a dummy load could be added at the output of the boost converter so that a minimum load current is guaranteed and consequently a minimum switching frequency in DCM. Again dissipation in the dummy load will lead to lower efficiency.

Another possible solution would be to force a transition from DCM to CCM where each burst ends when DCM is activated again due to the low load. Since the bursts in CCM require more switching events than in DCM, this also will lead to lower efficiency.

SUMMARY

An object of the disclosures is to implement efficient control means for a boost converter that reduces noise and/or interference.

According to the disclosures, there is provided a control circuit for a boost converter wherein the control circuit comprises switching means configured to switch the boost converter to perform cycles wherein each cycle comprises an energy charging state in which an inductor stores energy provided by an input voltage and an energy discharging state in which the inductor provides energy to an output of the boost converter, comparison means configured to decide whether a frequency of a switching event is lower than a predetermined minimum frequency and on-time signal generation means configured to generate an on-time signal based on whether a frequency of a switching event is lower than a predetermined minimum frequency, wherein the on-time signal determines a duration of a charging state of a next switching event and wherein the switching means is configured to switch the boost converter based on the generated on-time signal. Such arrangement provides an efficient control system for a boost converter wherein interference and distortion are reduced. By controlling duration of the charging state when the switching frequency of the boost is below a minimum, the boost converter is forced to increase the switching frequency in order to send the same amount of energy to the output. By increasing the switching frequency, it is avoided that the boost converter switching frequency falls within the human audible spectrum of frequencies, thereby avoiding audible noise, or interference within the audio signal patch on chip.

In an example of the present disclosure, the comparison means is further configured to decide whether the frequency of the switching event is higher than a predetermined maximum frequency and the on-time signal generation means is configured to generate the on-time signal based on whether the frequency of the switching event is higher than the predetermined first maximum frequency. This allows that the switching frequency of the boost converter is below a threshold and provides a returning path for the algorithm such that the switching frequency can be increased or decreased.

In an example of the present disclosure, the comparison means is further configured to decide whether the frequency of the switching event is higher than a predetermined second maximum frequency and the on-time signal generation means is configured to generate the on-time signal based further on whether the frequency of the switching event is higher than the predetermined second maximum frequency. This allows that the switching frequency of the boost converter is below a threshold and provides a returning path for the algorithm such that the switching frequency can be increased or decreased; wherein the second predetermined frequency is greater than 2.25 multiply by the first predetermined frequency. In this way, it is avoided toggling of the algorithm between two values for the duration of the on time signal.

In summary, this allows to first detect when the minimum frequency is reached in DCM, and then reduce the on-time to increase the resulting switching frequency in DCM. Then, when the load current decreases even further, and the frequency limit is reached again, this action can be repeated. For the reverse path, with increasing current, the on-time can be increased again when a different, higher, frequency limit is reached. This introduces a hysteresis in the control behavior to ensure a stable behavior. To detect fast increasing load current transients, a third frequency limit allows to reset the DCM minimum frequency regulation.

In an example of the present disclosure, the on-time signal generation means further comprises a control value and is configured to increase the control value if the frequency of the switching event is lower than the predetermined minimum frequency, and/or to decrease the control value if the frequency of the switching event is higher than the first predetermined maximum frequency and/or to reset the control value if the frequency of the switching event is higher than the second predetermined maximum frequency, and wherein the on-time signal is generated based on the control value. This is a very efficient way of increasing the duration of the charging state of the boost converter based on the switching frequency. For instance, parameters that determined said duration can be a function of said control value.

In an example of the present disclosure, the control circuit further comprises measurement means configured to receive a reference clock signal from a reference clock, to count a number of clock cycles during the switching event, and to determine the frequency of the switching event based on the number of clock cycles. This is a very efficient way of measuring the switching frequency of the boost converter.

In an example of the present disclosure, the on-time signal generation means comprises a feedback circuit wherein the feedback circuit comprises a feedback input and is configured to receive a charge current at the feedback input and to generate an on-time signal based on the charge current, and wherein the switching means is configured to switch the boost converter based on the on-time signal.

In an example of the present disclosure, the on-time signal generation means is configured to generate the charge current based on the determined duration of the charging state of the next switching event and a current in the inductor. This is a suitable way of controlling the duration of the charging state of the boost converter based on the switching frequency because the charge current has a direct effect on said duration.

In an example of the present disclosure, the control circuit is configured to generate the charge current based on the control value and the current in the inductor. This allows to efficiently controlling the charging state time based on the switching frequency because the charge current can be a function of the current in the inductor of the boost converter and the control value.

In an example of the present disclosure, the feedback circuit further comprises a capacitor and comparison circuit wherein the capacitor is configured to store a voltage based on the charge current, wherein the comparison circuit comprises a first input, a second input, wherein the comparison circuit is configured to receive a reference voltage at the first input, to receive the capacitor voltage at the second input, and to generate the on-time signal by comparing the reference voltage and the capacitor voltage.

In an example of the present disclosure, the capacitor comprises variable capacitor controlled based on the determined duration of the charging state of the next switching event. This allows to efficiently increase or decrease duration of the charging state by controlling the capacitor.

In another example of the present disclosure, the reference voltage is generated by a variable voltage source controlled based on the determined duration of the charging state of the next switching event.

According to the disclosures, there is further provided a boost converter circuit comprising the control circuit, an inductor, an input terminal configured to receive an input voltage and an output terminal configured to provide an output voltage and a method.

The person skilled in the art will understand that the features described above may be combined in any way deemed useful. Moreover, modifications and variations described in respect of the system may likewise be applied to a method of operating the boost converter circuit.

BRIEF DESCRIPTION OF THE DRAWINGS

In the following, aspects of the disclosures will be elucidated by means of examples, with reference to the drawings. The drawings are diagrammatic and are not drawn to scale.

FIGS. 7A-D show diagrams of the waveforms of several signals of a boost converter comprising the control circuit of FIG. 5 wherein the control circuit comprises the measurement means of FIG. 6.

FIGS. 10, 11A-F, 12A-F, 13A-F, 14A-F and 15A-F show diagrams of the waveforms of several signals of a boost converter comprising a control circuit according to embodiments of the disclosures shown in FIGS. 5, 6 and 8.

DESCRIPTION OF EMBODIMENTS

In the figures, the same reference numbers indicate elements that are similar in structure and function.

Figure 1A:
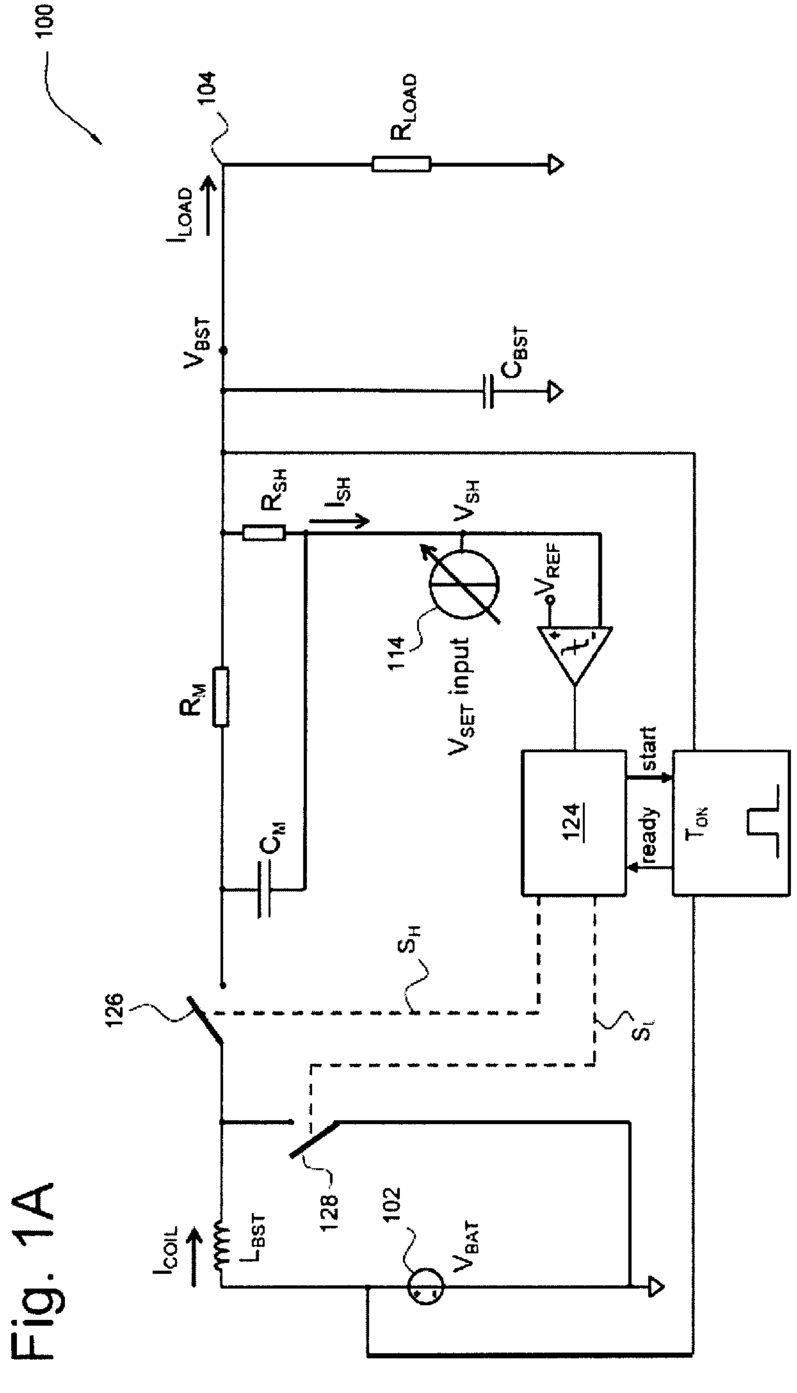
FIG. 1A shows a known boost converter circuit.
Figures 3A, 3B, 3C, 3D, 3E:
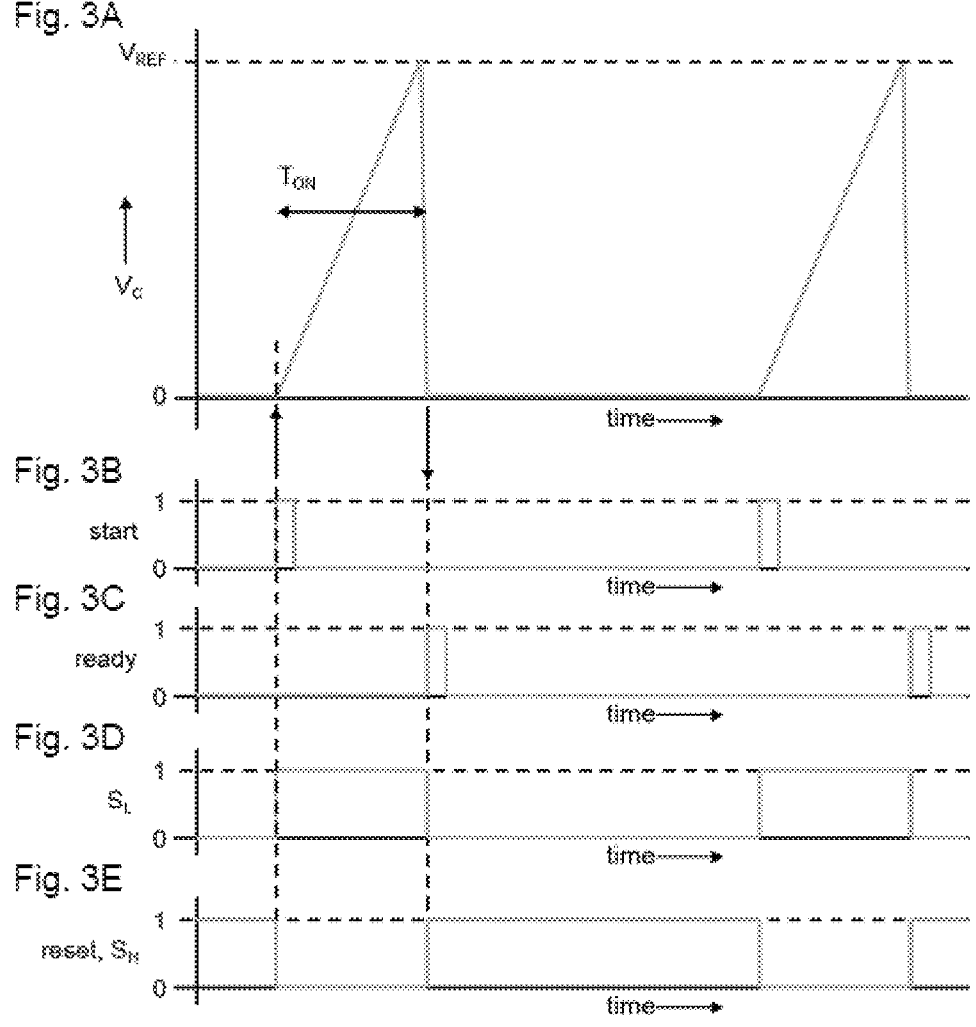
FIGS. 3A-E and 4 show diagrams of time waveforms of several signals of the boost converter circuit of FIG. 1A during operation.
Figure 4:
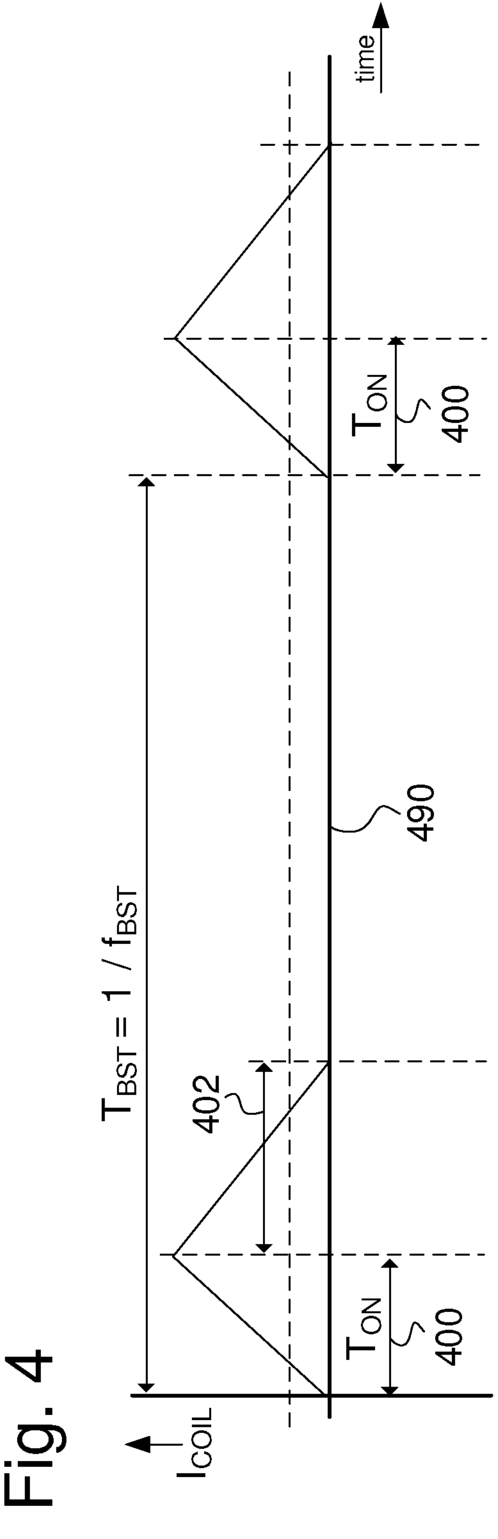

FIG. 1A shows a known boost converter circuit 100. FIGS. 3A-E show diagrams of time waveforms of several signals of the boost converter circuit of FIG. 1A during operation. FIG. 4 illustrates the value of $I_{COIL}$ in DCM as a function of time in the boost converter circuit of FIG. 1A. The $I_{COIL}$ is the current through the inductor $L_{BST}$ shown in FIG. 1A.

The operation of a boost converter circuit will be now explained with reference to FIGS. 1A, 2, 3A-E and 4.

As indicated in FIG. 4, during the time interval 400 the switch $S_L$ is close and the switch $S_H$ is open in order to connect the inductor $L_{BST}$ of FIG. 1A to the ground. When the inductor $L_{BST}$ is connected to ground, the boost converter circuit 100 enters into a charging state in which current flows through the inductor $L_{BST}$ and the inductor $L_{BST}$ stores some energy by generating a magnetic field. The current $I_{COIL}$ in the inductor $L_{BST}$ increases during the time interval 400 as it can be as shown in FIG. 4. Switching means 124 sends a control signal $S_L$ to open the switch 128 in order to disconnect the inductor $L_{BST}$ from the ground, and a control signal $S_H$ to close the switch 126 in order to connect the inductor $L_{BST}$ to the output $V_{BST}$ and the boost converter circuit enters into a discharging state in which, during the time interval 402 shown in FIG. 4, the energy previously accumulated in the inductor $L_{BST}$ is transferred to the output $V_{BST}$ and the current $I_{COIL}$ in the inductor $L_{BST}$ starts decreasing. Time intervals 400 and 402 are part in this case of a discontinuous mode event wherein a completed switching cycle has been performed by the circuit. A new discontinuous mode event starts with time interval $T_{BST}$.

A target output boost voltage $V_{BST}$ for the boost converter of FIG. 1A is set by choosing an appropriate value for the current $I_{SH}$ using the adjustable current source 114 as follows:

$$I_{SH} = \frac{V_{BST,TARGET} - V_{REF}}{R_{SH}}$$

In the boost converter of FIG. 1A, the switch 128 is closed with a frequency f and a duty cycle D that depends on the output voltage $V_{BST}$ and on the input voltage $V_{BAT}$ in a periodic steady state condition with constant load is as follows:

$$D = \frac{V_{BST} - V_{BAT}}{V_{BST}}$$

The on-time signal $T_{ON}$ of the boost converter of FIG. 1A, i.e., the period of time 300, is related to the switching frequency f and the duty cycle D in the following way:

$$f = \frac{D}{T_{ON}}$$

This means that, for a fixed value of the on-time signal $T_{ON}$, the frequency f would depend on the duty cycle D, and therefore on both the input voltage $V_{BAT}$ and the output voltage $V_{BST}$, which is generally not desirable. Therefore, the on-time signal $T_{ON}$ is usually chosen to depend on the input voltage $V_{BAT}$, the output voltage $V_{BST}$ and the intended switching frequency $f_{TARGET}$ as indicated below:

$$T_{ON} = \frac{V_{BST} - V_{BAT}}{f_{TARGET} V_{BST}}$$

The actual switching frequency f will be equal to the intended frequency $f_{TARGET}$, and independent of the input voltage $V_{BAT}$ and the output voltage $V_{BST}$ in the following way:

$$f = \frac{D}{T_{ON}} = \frac{\frac{V_{BST} - V_{BAT}}{V_{BST}}}{T_{ON}} = \frac{\frac{V_{BST} - V_{BAT}}{V_{BST}}}{\frac{V_{BST} - V_{BAT}}{f_{TARGET} V_{BST}}} = f_{TARGET}$$

Figure 2:
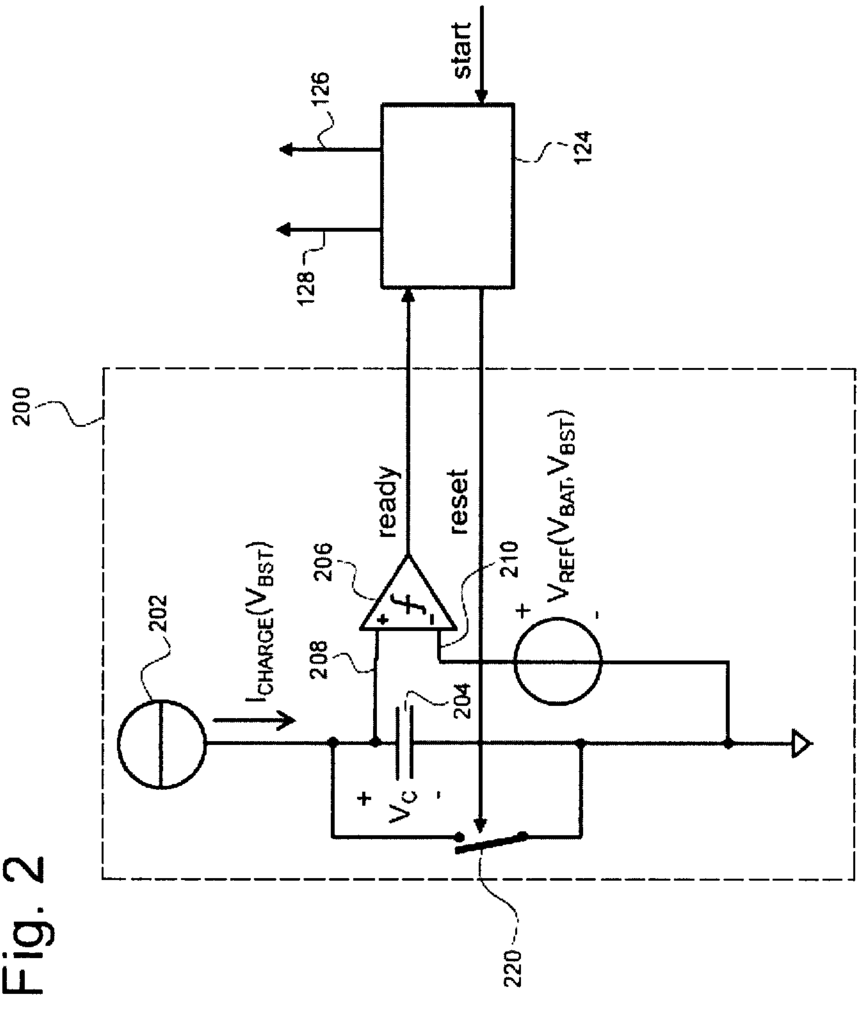

FIG. 2 shows the pulse generator circuit 200 for generating the on-time signal $T_{ON}$ and the switching means 124 of FIG. 1A. FIG. 3A shows a diagram of the time wave form of the on-time signal $T_{ON}$. FIGS. 3B and 3C show diagrams of the time wave forms of the start and ready signals, respectively, for the boost converter 100 of FIG. 1A. Finally, FIGS. 3D and 3E show diagrams of the time wave forms of the first and second switching signals $S_L$ and $S_H$, respectively, for the same boost converter 100. The switching means 124 also controls the switches 128 and 126 to open/close based on a zero current signal (shown in FIGS. 3A-C).

The pulse generator circuit 200 for generating the on-time signal $T_{ON}$ shown in FIG. 2 comprises a current source 202, a capacitor 204 and a comparator 206. The comparator 204 comprises a first input 208 and a second input 210. The switching means 124 are configured to receive a start signal and to generate a reset signal such that, when the start signal goes high, the reset signal goes low such that a switch 220 is closed and a voltage $V_C$ across the capacitor 204 increases linearly with time until the first input 208 of the comparator 206 reaches a reference voltage $V_{REF}$ received at the second input 210 of the comparator 206. At that moment, the comparator 206 generates a ready signal that opens the switch 220 and resets the voltage $V_C$ to zero. The switching means 124 generates control signals to drive the switches $S_H$ and $S_L$ based on the start signal and the ready signal.

Figures 1B, 1C:
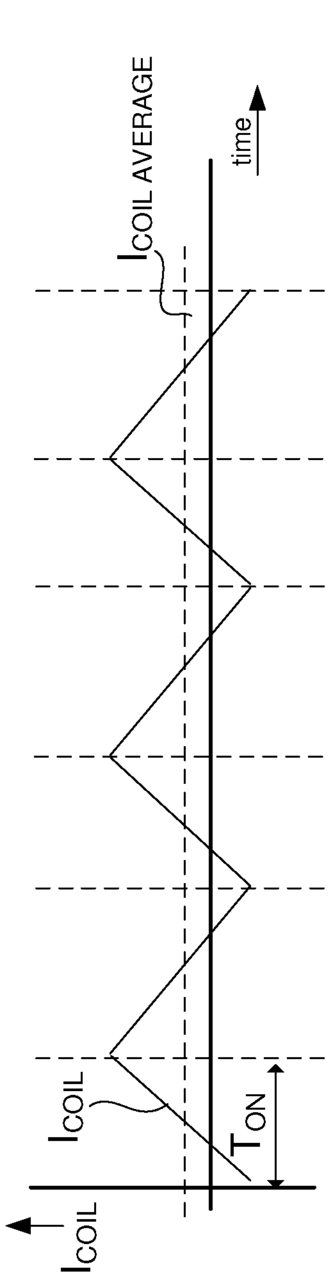
FIG. 2 shows a known circuit to generate an on-time signal and FIGS. 1B-C show diagrams of time waveforms of several signals of a boost converter circuit comprising the circuit to generate the on-time signal of FIG. 2 during operation.

For a given combination of output voltage $V_{BST}$ and input voltage $V_{BAT}$ and a sufficiently high load current $I_{LOAD}$, the current $I_{COIL}$ in the inductor $L_{BST}$ behaves in a periodic steady state with switching frequency $f_{TARGET}$ as can be seen in FIG. 1B. This mode of operation is usually referred to as continuous conduction mode (CCM), since there is always a current flowing in the inductor.

For the same combination of output voltage $V_{BST}$ and input voltage $V_{BAT}$ but with a low load current $I_{LOAD}$, the current $I_{COIL}$ in the inductor $L_{BST}$ behaves as shown in FIG. 1C. Note that the current $I_{COIL}$ in the inductor $L_{BST}$ can also be negative in this case. For zero load current $I_{LOAD}$, the average inductor current $I_{COIL}$, average is also zero, and the converter is just moving charge from battery to output capacitor and back without net effect besides power dissipation.

To minimize the dissipation for low load conditions, a discontinuous operating mode (DCM) is usually used as can be seen in FIG. 4. In this mode the zero crossing of the inductor current $I_{COIL}$ is detected and a period 490 wherein both switches 128 and 126 are open starts, so that no current is flowing through the inductor $L_{BST}$. As soon as the boost voltage drops below the required level, the next switching event is initiated by switching on the switch 128 for a period $T_{ON}$. For low load, this significantly reduces the amount of switching events and therefore the dissipation is minimized and the efficiency is higher. The switching frequency in DCM will be lower than the (target) switching frequency in CCM.

Figure 5:
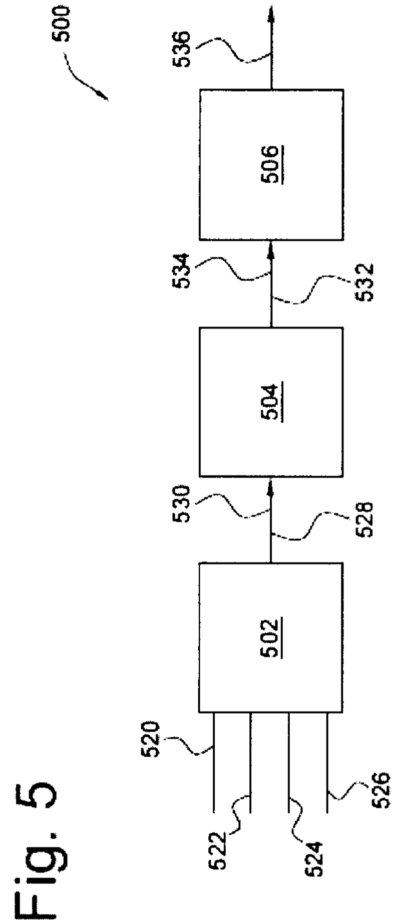
FIG. 5 shows a schematic of a control circuit for a boost converter according to an embodiment of the disclosures.

FIG. 5 shows a control circuit 500 for a boost converter according to an embodiment of the disclosures. The control circuit 500 comprises comparison means 502, on-time signal generation means 504, and switching means 506.

The comparison means 502 of the control circuit 500 shown in FIG. 5 comprises a first input 520, a second input 522 and an output 528. The first input 520 is configured to receive information regarding a switching frequency of the boost converter, wherein the switching frequency is the frequency at which switching events take place. The second input 522 is configured to receive a first threshold value indicating a predetermined minimum frequency. The comparison means 502 is configured to decide whether the frequency of a switching event is lower than a predetermined minimum frequency by comparing the information regarding the switching frequency received at the first input 520 and the first threshold value received at the second input 522. The comparison means 502 may optionally comprise a third input 524 and/or a fourth input 526. The third input 524 may be configured to receive a second threshold value indicating a first predetermined maximum frequency and the fourth input 526 may be configured to receive a third threshold value indicating a second predetermined maximum frequency. The comparison means 502 may be configured to decide whether the frequency of a switching event is higher than the first predetermined maximum frequency by comparing the information regarding the switching frequency received at the first input 520 and the second threshold value received at the third input 524. Furthermore, the comparison means 502 may be configured to decide whether the frequency of a switching event is higher than the second predetermined maximum frequency by comparing the information regarding the switching frequency received at the first input 520 and the third threshold value received at the third input 524. The comparison means 502 may generate a signal at the output 528 indicating whether the frequency of a switching event is lower than the first threshold, and/or higher than the second threshold and/or higher than the third threshold.

The on-time signal generation means 504 of the control circuit 500 shown in FIG. 5 comprises an input 530 and an output 532. The input 530 is configured to receive the signal generated by the comparison means 502 at the output 528. The on-time signal generation means 504 is further configured to generate an on-time signal at the output 532. The on-time signal is generated based on the signal received at the input 530. The on-time signal will be used to generate the charging state of the next switching event of the boost converter and wherein the switching means is configured to switch the boost converter based on the generated on-time signal.

The switching means 506 of the control circuit 500 shown in FIG. 5 comprises an input 534 and an output 536. The input 534 of the switching means 506 is configured to receive the on-time signal at the output 528 of the on-time signal generator 504. The switching means 506 is configured to switch the boost converter to perform cycles wherein each cycle comprises an energy charging state in which an inductor stores energy provided by an input voltage at an input of the boost converter and an energy discharging state in which the inductor provides energy to an output of the boost converter. Each time the on-time generator signal is activated, a new switching event, i.e., cycle starts. The boost converter will be in a charging state until the on-time signal is deactivated. Then, the boost converter will enter in a discharging state. The cycle or switching event will start when the on-time signal is activated again.

The on-time signal generation means 504 may further comprises a control value (not shown in FIG. 5) configured to increase if the frequency of the switching event is lower than the predetermined minimum frequency. The on-time signal at the output 532 may be generated based on said control value. The control value may be further configured to decrease if the frequency of the switching event is higher than the first predetermined maximum frequency and the on-time signal is generated based on the control value, and/or to reset if the frequency of the switching event is higher than the second predetermined maximum frequency the on-time signal is generated based on the control value. The control value may increase and/or decrease by adding one to the previous stored value and/or may reset to zero. However, the control value may increase/decrease/reset to any suitable value. The on-time signal generation means may comprise a register configured to store the control value.

Figure 6:
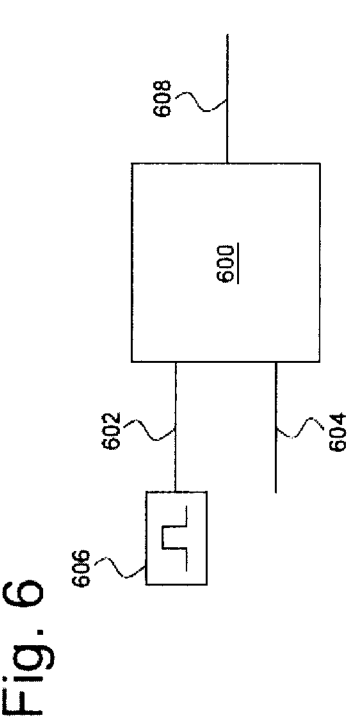
FIG. 6 shows a schematic of measurement means according to an embodiment of the disclosures.

The control circuit 500 of FIG. 5 may comprise the measurement means 600 shown in FIG. 6. The measurement means 600 shown in FIG. 6 comprise a first input 602, a second input 604 and an output 608. The first input 602 is configured to receive a reference clock signal from a reference clock 606. The second input 604 may be configured to receive a signal indicating that a switching event starts and that a switching event ends. The measurement means may be configured to count the number of clock cycles of the reference clock 606 received at the first input 602 during the time that the switching event lasts as indicated by the signal received at the second input 604. In this way, the measurement means 600 may generate information about the frequency of the switching event based on said number of clock cycles and send the information to the output 608. The output 608 of the measurement means 600 shown in FIG. 6 may be coupled to the first input 520 of the comparison means 520 shown in FIG. 5.

The measurement means 600 shown in FIG. 6 allows measuring the switching frequency $f_{BST}$ using the reference clock 606 at clock frequency fclk where fclk>>$f_{BST}$. In this way, the switching period $T_{BST}$ of the boost converter can be measured by counting clock cycles after starting a switching event with the on-time signal $T_{ON}$. At the next switching event, the count performed by the measurement means 600 represents the period of the switching frequency $f_{BST}$. Then the count may be reset, for instance to zero, and a new value for the on-time signal $T_{ON}$ can be determined by the ontime-signal generating means 504 based on the measured frequency. This will result in a modified switching frequency $f_{BST}$. At the next switching event the process repeats. The counting action may be a function performed in the digital domain where the reference clock 606 may be available. The measurement means 600 of FIG. 6 may comprise a register (not shown) to store the count result.

Figures 7A, 7B, 7C:
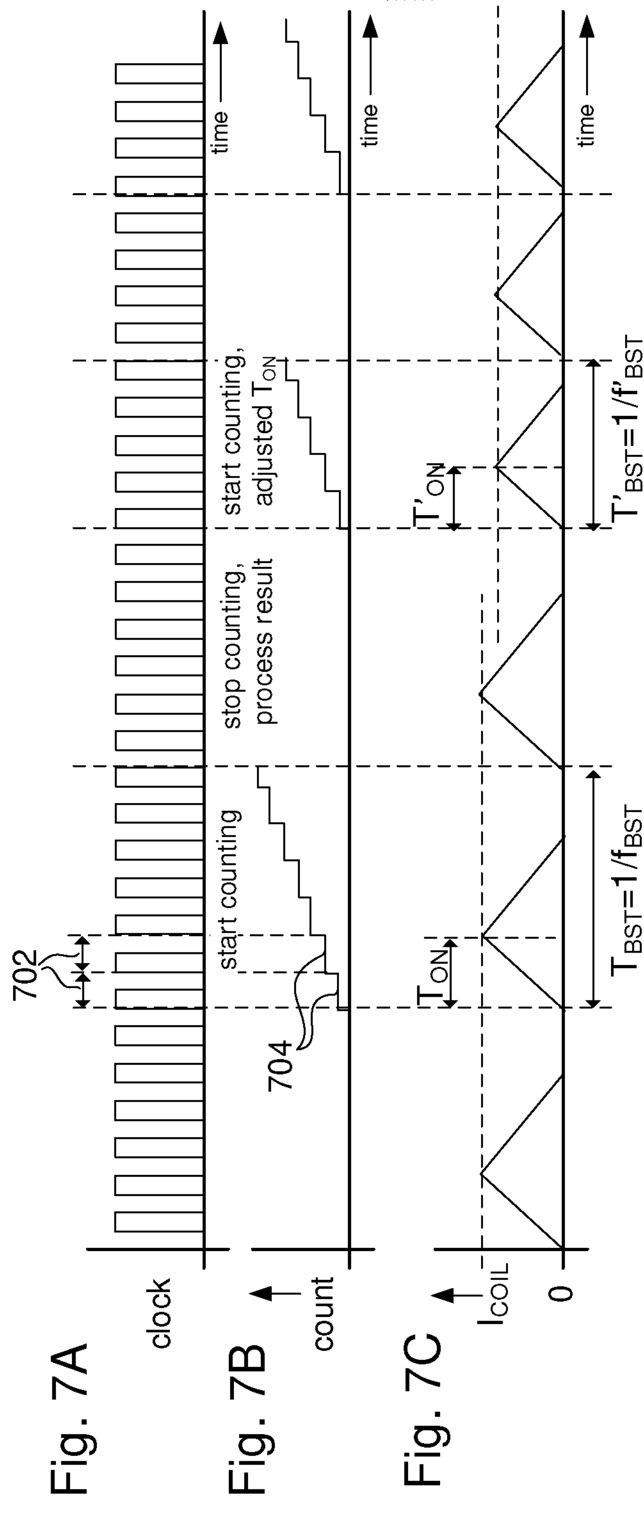
Figure 7D:
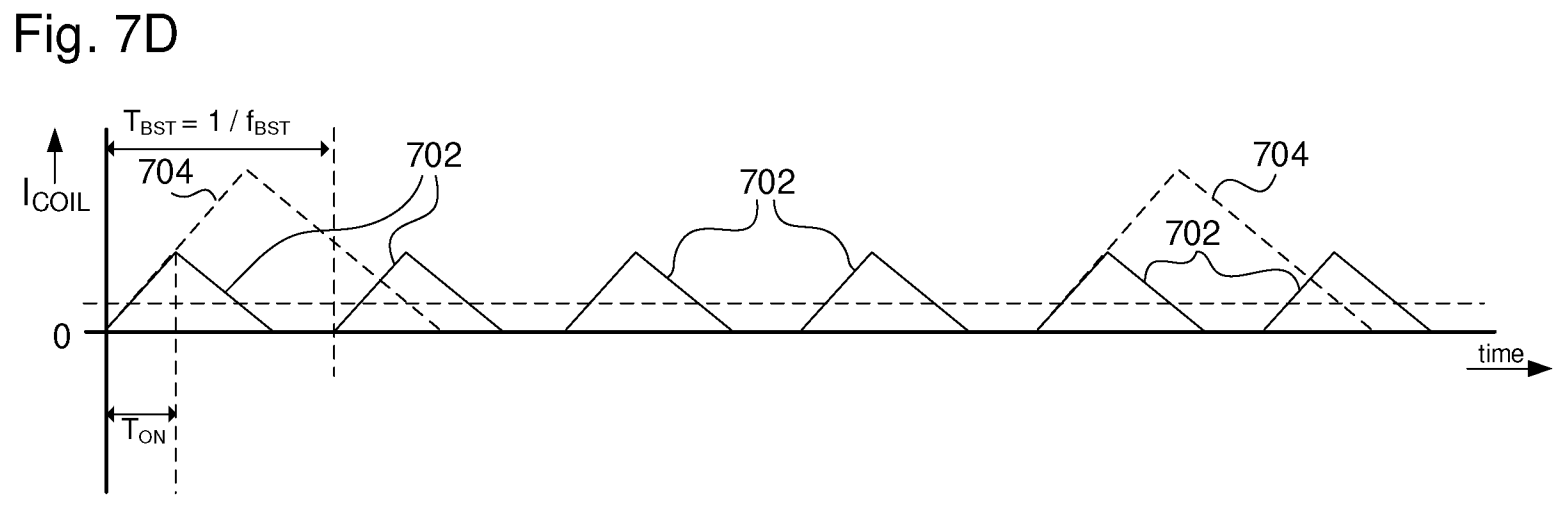

This procedure is illustrated in FIGS. 7A-D, which show diagrams of the waveforms of several signals of a boost converter comprising the control circuit 500 shown in FIG. 5 wherein the control circuit comprises the measurement means 600 shown in FIG. 6. FIG. 7A shows the waveform of the reference clock signal of an example of reference clock 606. FIG. 7B shows the waveform of the count performed by the measurement means 600. FIG. 7C shows diagrams of the waveform of the current $I_{COIL}$, through the inductor of a boost converter using the control means shown in FIGS. 5 and 6. As shown in FIGS. 7A and 7B, each time the reference clock 606 performs a cycle 702, the measurement means 600 increases the count one step 704. The result of this count is sent to the on-time generating means 504 and the duration of the charging state of the boost circuit is modified based on said count as it can be seen in FIG. 7C wherein the $T'_{ON}$ is smaller than $T_{ON}$. FIG. 7D shows waveforms 702 corresponding to the inductor current as a function of time when the disclosures are applied and waveforms 704 corresponding to the inductor current as a function of time when the disclosures is not applied. As shown in FIG. 7D, by reducing the duration of the charging $T_{ON}$, the switching frequency $f_{BST}$ is increased because the boost converter needs to switch more times in order to charge the same amount of energy. In this way, the frequency $f_{BST}$ can be manipulated using the on time $T_{ON}$. In FIG. 7C, the duration of the time on is reduced from $T_{ON}$ to $T_{ON}$. By reducing the duration of the on-time period, the amount of charge transferred per switching event is reduced and more switching events will be needed for same load current $I_{LOAD}$ leading to a higher switching frequency $f'_{BST}$ with $T'_{BST}=1/F'_{BST}$. As an example, consider the case in FIG. 7C when the duration of the on-time period is reduced with a factor 2. This will decrease the amount of charge transferred in a single pulse with a factor 4 since the area below triangular shaped current pulse is proportional with the square of the height. Therefore, the frequency will step up with a factor 4 as can be seen in FIG. 7D.

Figure 8:
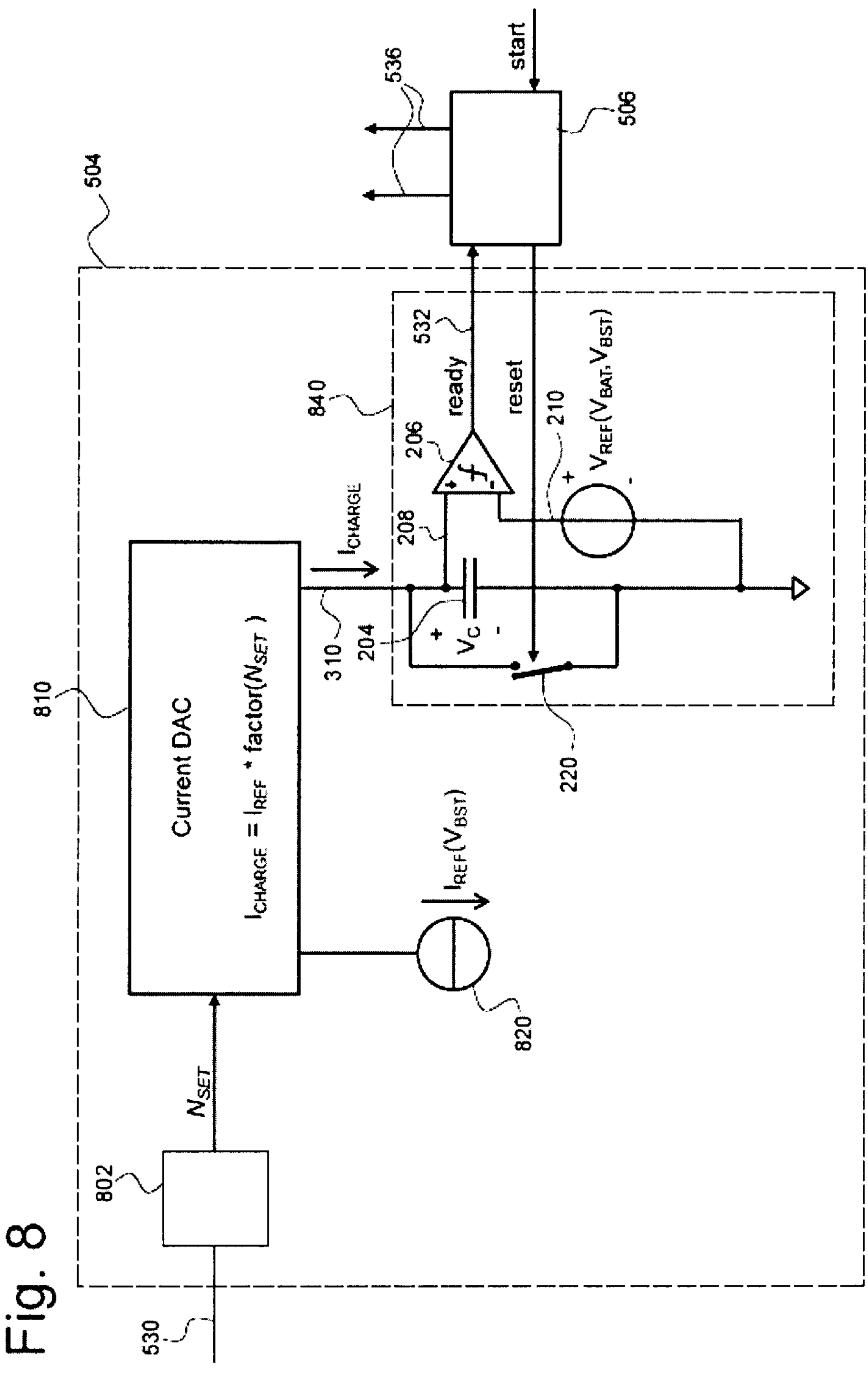
FIG. 8 shows a circuit comprising measurement means and switching means according to an embodiment of the disclosures.

FIG. 8 shows an example of the measurement means 504 and the switching means 506 according to an embodiment of the disclosures. The measurement means 504 receives at the input 530 the result generated by the comparison means 502 and, based on said result, generates the on-time signal at the output 532. The on-time signal generation means 504 may further comprises a feedback circuit 840 similar to the one shown and explained with respect to FIG. 2. The feedback circuit shown in FIG. 8 comprises a feedback input 310 and is configured to receive a charge current $I_{CHARGE}$ at the feedback input 310 and to generate the on-time signal 532 based on the charge current $I_{CHARGE}$. Note that $I_{CHARGE}$ is proportional to the output voltage $V_{BST}$ and the reference voltage $V_{REF}$ is proportional to $V_{BST}-V_{BAT}$ to obtain the required target frequency in continuous conduction mode (CCM).

The on-time signal generation means 504 is configured to generate the charge current $I_{CHARGE}$ based on the determined duration of the charging state of the next switching event and a current in the inductor. The on-time signal generation means 504 shown in FIG. 8 may further comprise a register 802 configured to store a control value $N_{SET}$, wherein the control value $N_{SET}$ is the signal 528 generated by the comparison means 502 at the output 528 and indicates whether the frequency of a switching event is lower than the first threshold, and/or higher than the second threshold and/or higher than the third threshold.

The on-time signal generator 504 of FIG. 8 is configured to modify the on-time signal 532 based on the control value $N_{SET}$ in order to change the switching frequency. The on-time signal generator 528 of FIG. 8 comprises a current Digital Analogic Converter (DAC) 810 configured to generate a multiplication factor of $N_{SET}$. Instead of a DAC, any other suitable circuit may be used. The current DAC 810 may be configured to scale the charge current $I_{CHARGE}$ by using a correction factor. The correction factor depends on the control value $N_{SET}$ which is a 3-bit signal in this example. However, the control value $N_{SET}$ may comprise any other number of bits. In another embodiments, the capacitor 204 may be a variable capacitor and the on-time signal generation means 504 may be configured to scale the capacitor value of the capacitor 204 based on the control value $N_{SET}$. Alternatively, the reference voltage $V_{REF}$ may be scaled based on $N_{SET}$ by using, for instance a variable voltage source to generate reference voltage $V_{REF}$. I.e., an alternative way to manipulate the on-time signal 532 $T_{ON}$ is to scale the capacitor size or to scale $V_{REF}$ with 1/factor.

The on-time signal generating means 504 may comprise further a current source 820 configured to generate a reference current $I_{REF}$ and the current DAC 810 is configured to generate the charge current $I_{CHARGE}$ based on the control value $N_{SET}$ as follows:

$$I_{CHARGE} = I_{REF}\ \text{factor}$$

For the ease of illustration, we choose a certain function for factor although many alternatives can be used:

$$\text{factor} = 1 + N_{SET}/2$$

As shown in FIG. 8, the feedback circuit further comprises the capacitor 204 and comparison circuit 206 wherein the capacitor is configured to store a voltage $V_C$ based on the charge current $I_{CHARGE}$. The comparison circuit 206 is configured to receive a reference voltage $V_{REF}$ at the first input 208, to receive the capacitor voltage $V_C$ at the second input 210, and to generate the on-time signal 532 by comparing the reference signal and the capacitor voltage.

If the control value $N_{SET}$ comprises 3 bits, there are now 8 possible values for the charge current $I_{CHARGE}$ and 8 possible values for the on-time for a given combination of $V_{BAT}$ and $V_{BST}$.

$$T_{ON} = V_{REF}\frac{C}{I_{CHARGE}} = V_{REF}\frac{C}{I_{REF}\ \text{factor}}$$

The corrected on-time scales with 1/factor compared to the value for the control value $N_{SET}=0$:

$$T_{ON} = \frac{T_{ON,N_{SET}=0}}{\text{factor}}$$

For a given load current, the corrected switching frequency scales with factor$^2$ to uncorrected switching frequency (for a control value $N_{SET}=0$):

$$f_{BST} = \text{factor}^2\ f_{BST,N_{SET}=0}$$

For a 3-bit value of the control value $N_{SET}$, the scaling factors of the example are given in table 1. With this implementation the minimum load current can be 20.25 lower than it would be with no regulation system (i.e., factor=1) before reaching the minimum switching frequency. The maximum $N_{SET}$ value can be designed considering the self-loading of the booster output in a way that, even with zero external $I_{LOAD}$, the switching frequency is above the required minimum.

TABLE 1

| $N_{SET}$ | $I_{CHARGE}/I_{REF}$ factor $(1 + N_{SET}/2)$ | $I_{ON}/I_{ON,\ NSET=0}$ 1/factor $1/(1 + N_{SET}/2)$ | $F_{BST}/f_{BST,\ NSET=0}$ Factor$^2$ $1/(1 + N_{SET}/2)^2$ |
|---|---|---|---|
| 0 | 1 | 1.00 | 1.00 |
| 1 | 1.5 | 0.67 | 2.25 |
| 2 | 2 | 0.50 | 4.00 |
| 3 | 2.5 | 0.40 | 6.25 |
| 4 | 3 | 0.33 | 9.00 |
| 5 | 3.5 | 0.29 | 12.25 |
| 6 | 4 | 0.25 | 16.00 |
| 7 | 4.5 | 0.22 | 20.25 |

Figure 9:
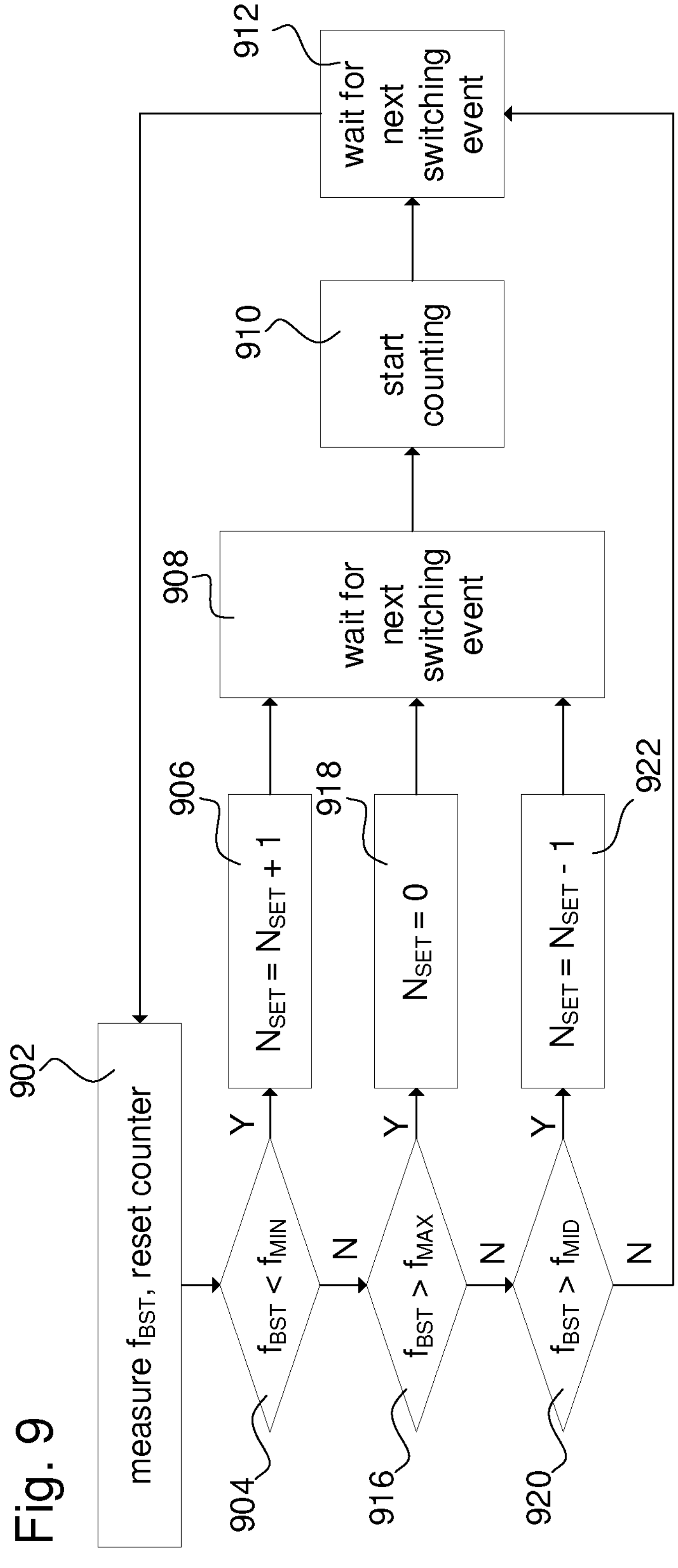
FIG. 9 shows a flow diagram of a method to operate a control circuit according to an embodiment of the disclosures.
Figures 11A, 11B, 11C, 11D, 11E, 11F:
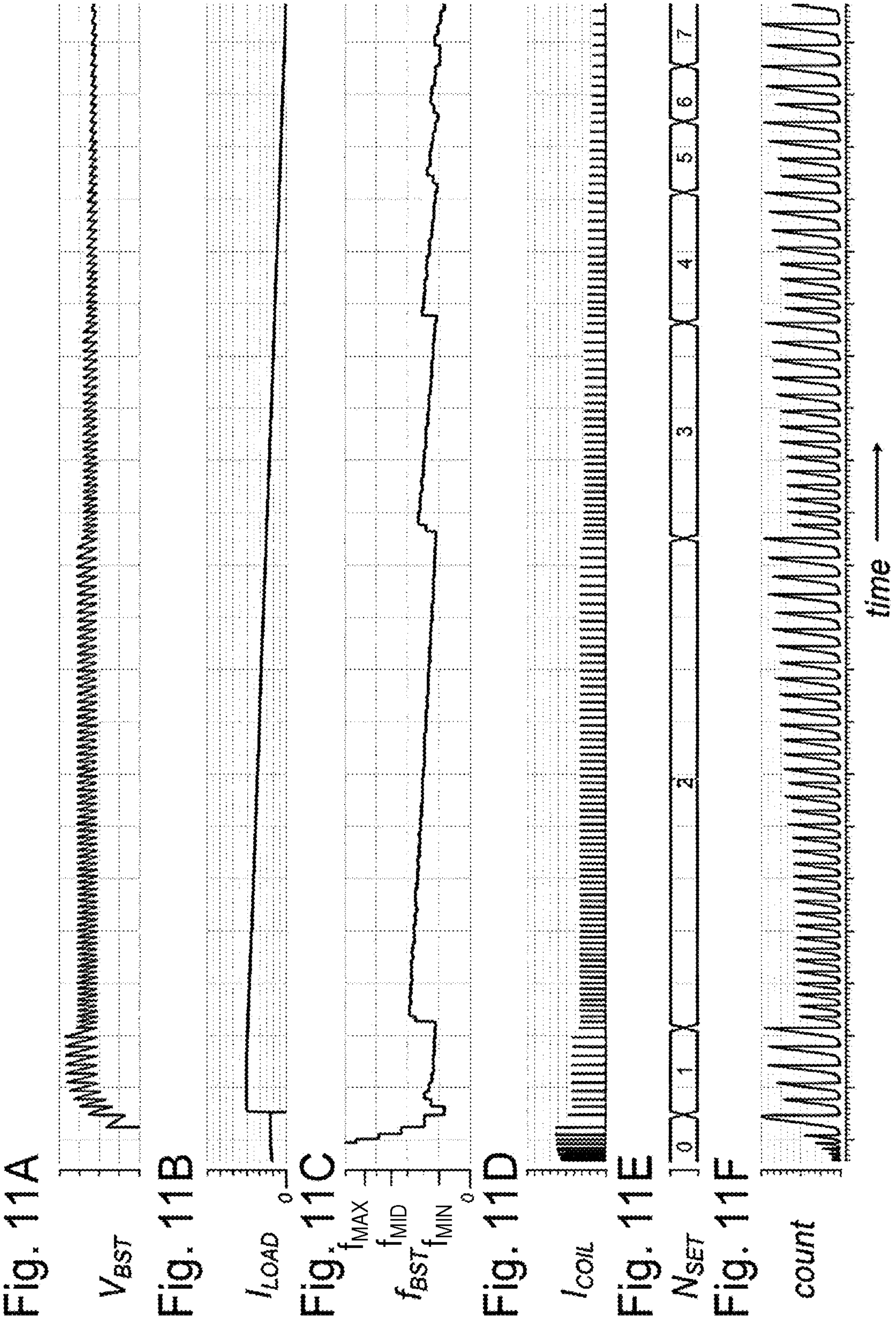
Figures 12A, 12B, 12C, 12D, 12E, 12F:
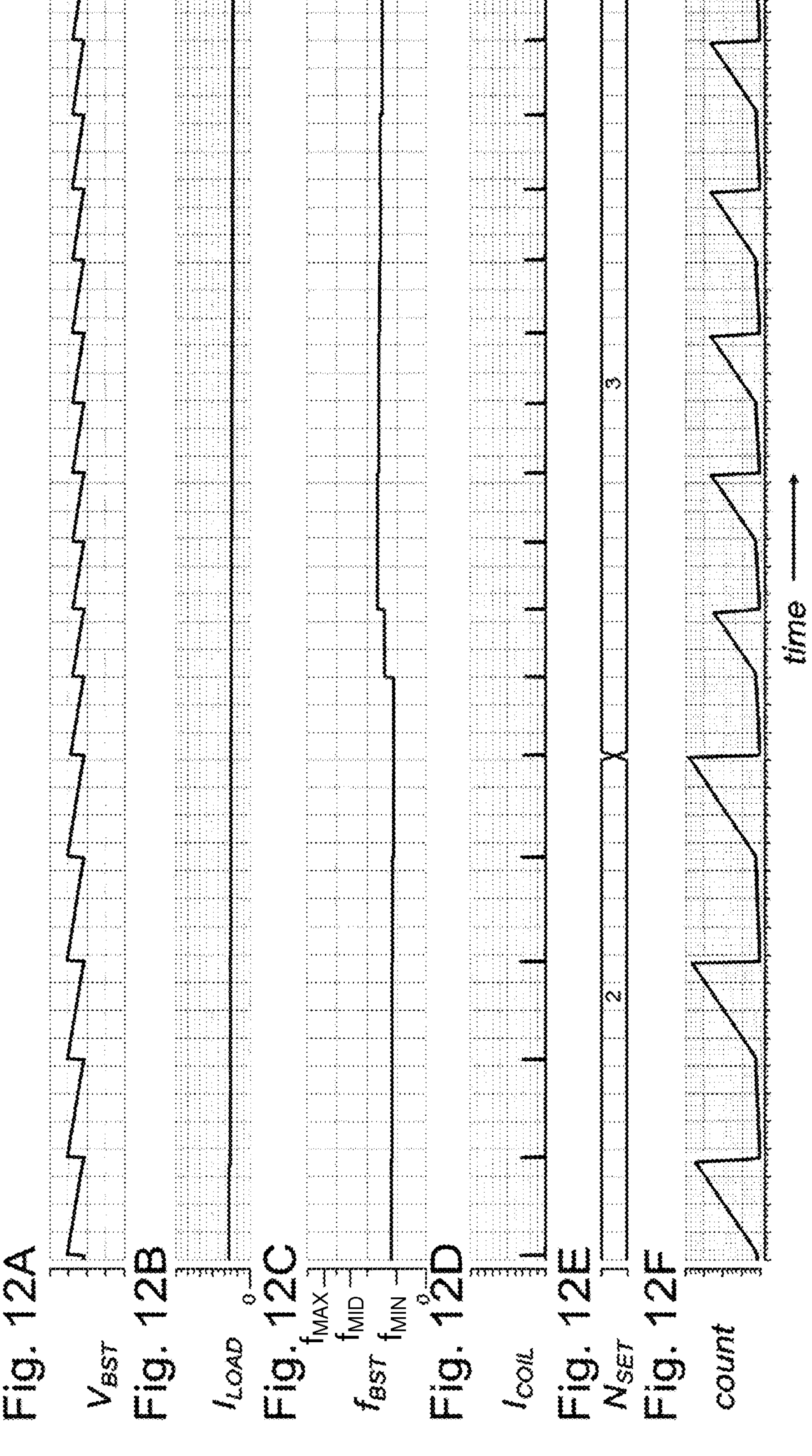
Figures 13A, 13B, 13C, 13D, 13E, 13F:
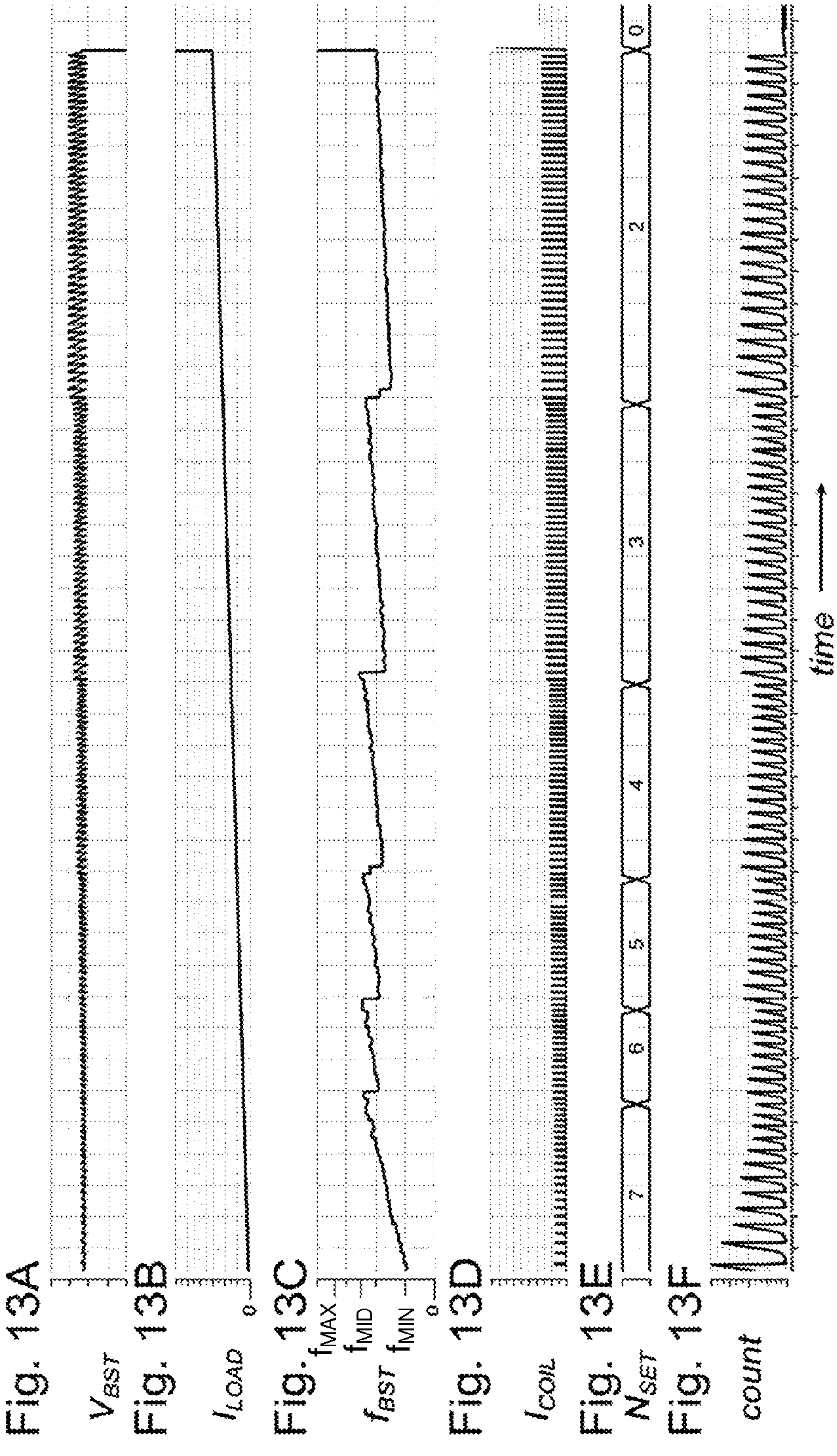
Figures 14A, 14B, 14C, 14D, 14E, 14F:
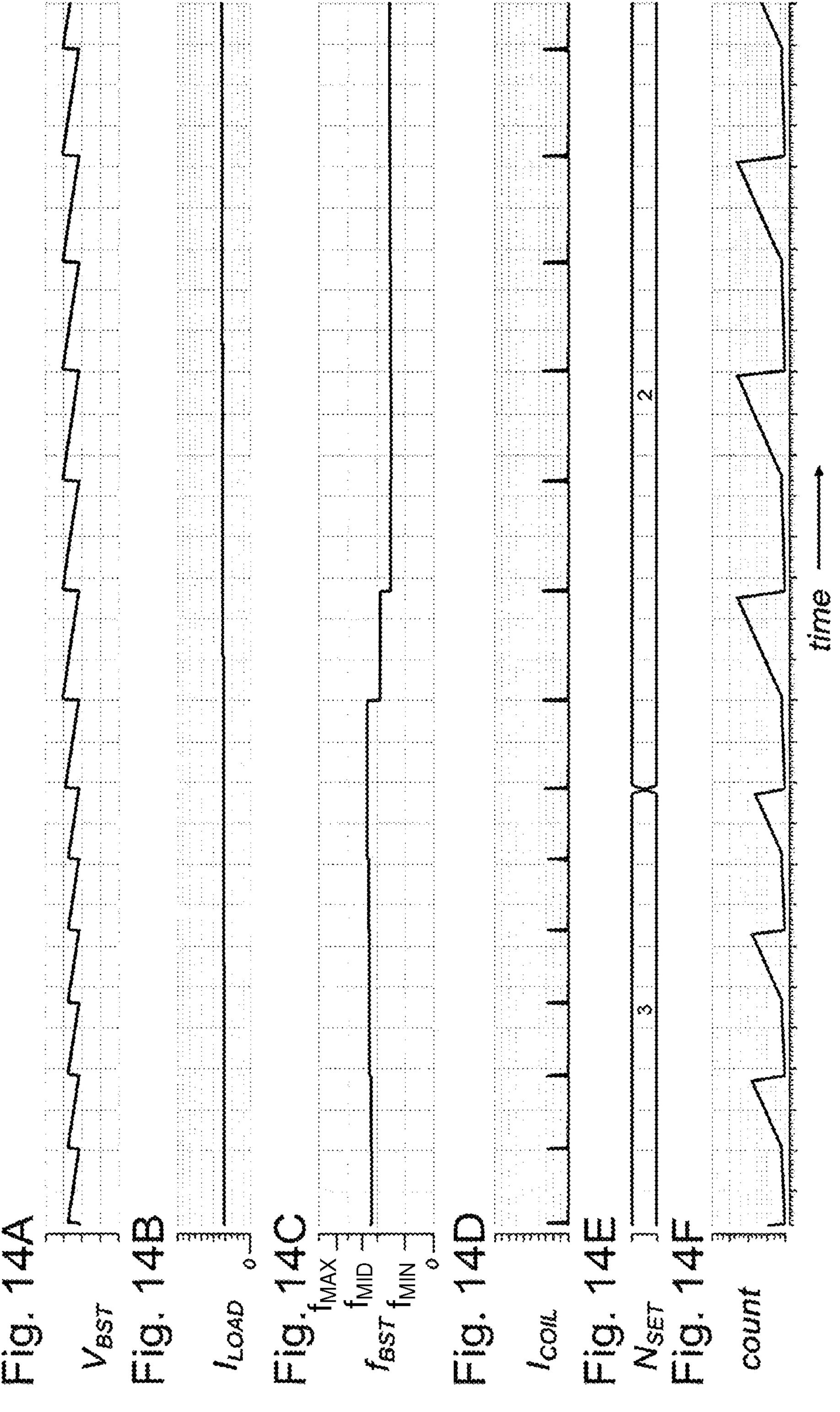
Figures 15A, 15B, 15C, 15D, 15E, 15F:
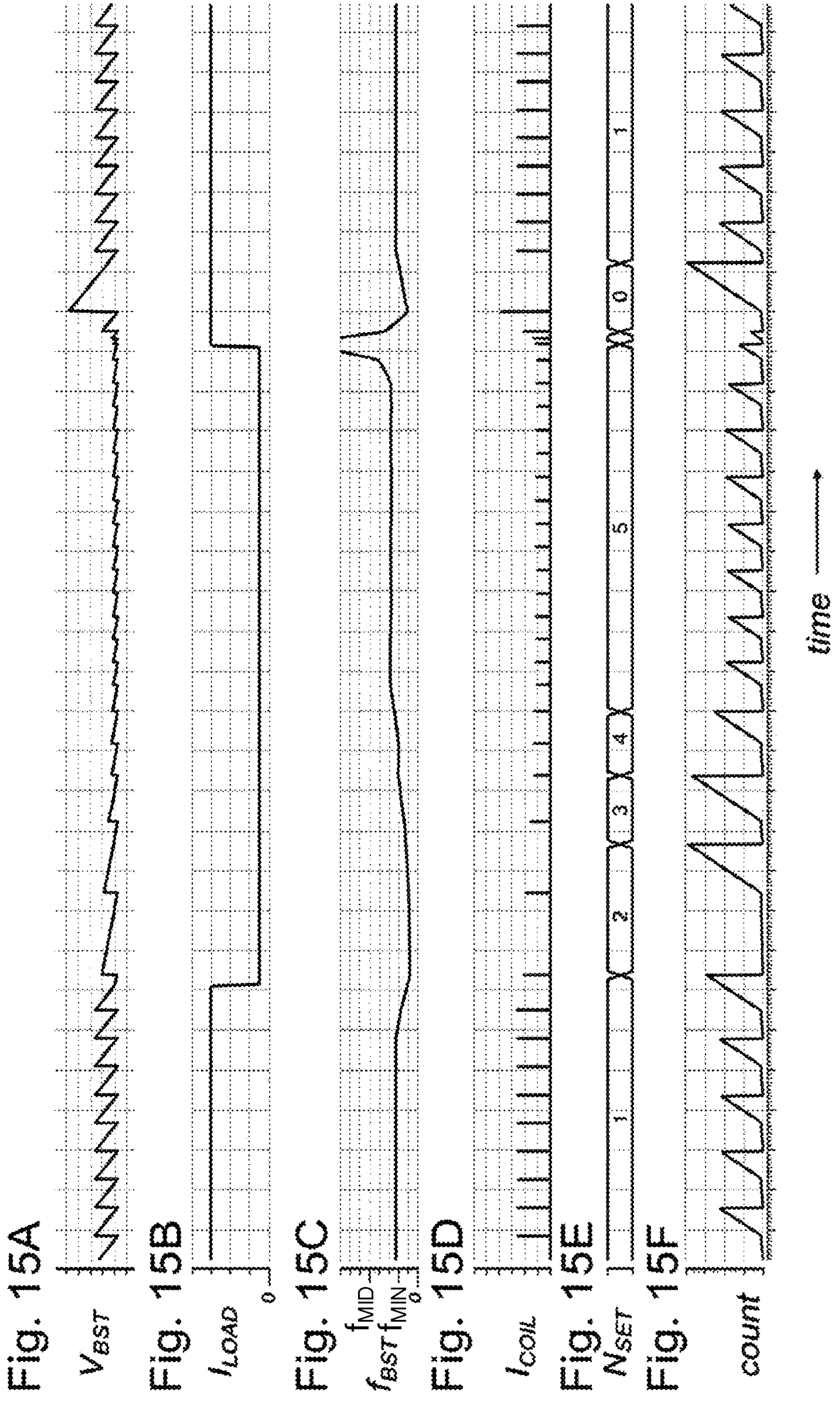

FIG. 9 shows a flow diagram of a method for operating the control circuit of FIG. 5. To modify the on-time in order to change the switching frequency the on time $T_{ON}$ is made dependent on a multi-bit control value $N_{SET}$. When the boost converter enters to DCM, the control value $N_{SET}$ starts with a value of zero, so with the same on-time as in CCM. In step 902, the switching frequency $f_{BST}$ is measured. In step 904, if the load current decreases so much that the switching frequency $f_{BST}$ goes below the predetermined minimum frequency $f_{MIN}$, the method proceeds to step 906 wherein the value of the control value $N_{SET}$ is increased by one unit so that the on-time is decreased. Consequently, the switching frequency is increased with one step. The method proceeds then to step 908 to wait for the next switching event. When the next switching event starts, the method goes to step 910 and starts counting to measure the switching frequency $f_{BST}$.

In step 912, when the next switching event is detected, the counting is ended. Then the method proceeds again to step 902 wherein the count result will be used to determine the switching frequency.

In step 904, if the switching frequency is not below the predetermined minimum frequency, the method goes to step 916 wherein it is determined whether the switching frequency is above a first predetermined maximum value $f_{MAX}$. In case the switching frequency is above a first predetermined maximum value $f_{MAX}$, the control value $N_{SET}$ is reset to zero in step 918 and the method proceeds to step 908. In case the switching frequency is not above a first predetermined maximum value $f_{MAX}$, the method proceeds to step 920.

In step 920, if the switching frequency is above the second predetermined minimum frequency $f_{MID}$, the method goes to step 922 wherein the value of the control value $N_{SET}$ is decreased by one unit so that the on-time is increased. Consequently, the switching frequency is decreased with one step. The method proceeds then to step 908 to wait for the next switching event.

In case the switching frequency is not above the second predetermined maximum value $f_{MID}$, the method proceeds to step 912.

In this way, these steps process repeats as long as the load current decreases (and $N_{SET}$ does not reach its maximum value). When the load current increases, the frequency will also increase until $f_{MID}$ is reached. Then the value of $N_{SET}$ is decreased with 1 to step back to a larger on-time and a lower frequency again. With slow varying load current the stepwise behavior will be observed. However, when a fast load current step-up occurs, the measured frequency will be above a maximum value $f_{MAX}$, and $N_{SET}$ is reset to 0.

FIGS. 10, 11A-F, 12A-F, 13A-F, 14A-F and 15A-F show diagrams of the waveforms of several signals of a boost converter comprising a control circuit according to embodiments of the disclosures shown in FIGS. 5, 6 and 8.

Figure 10:
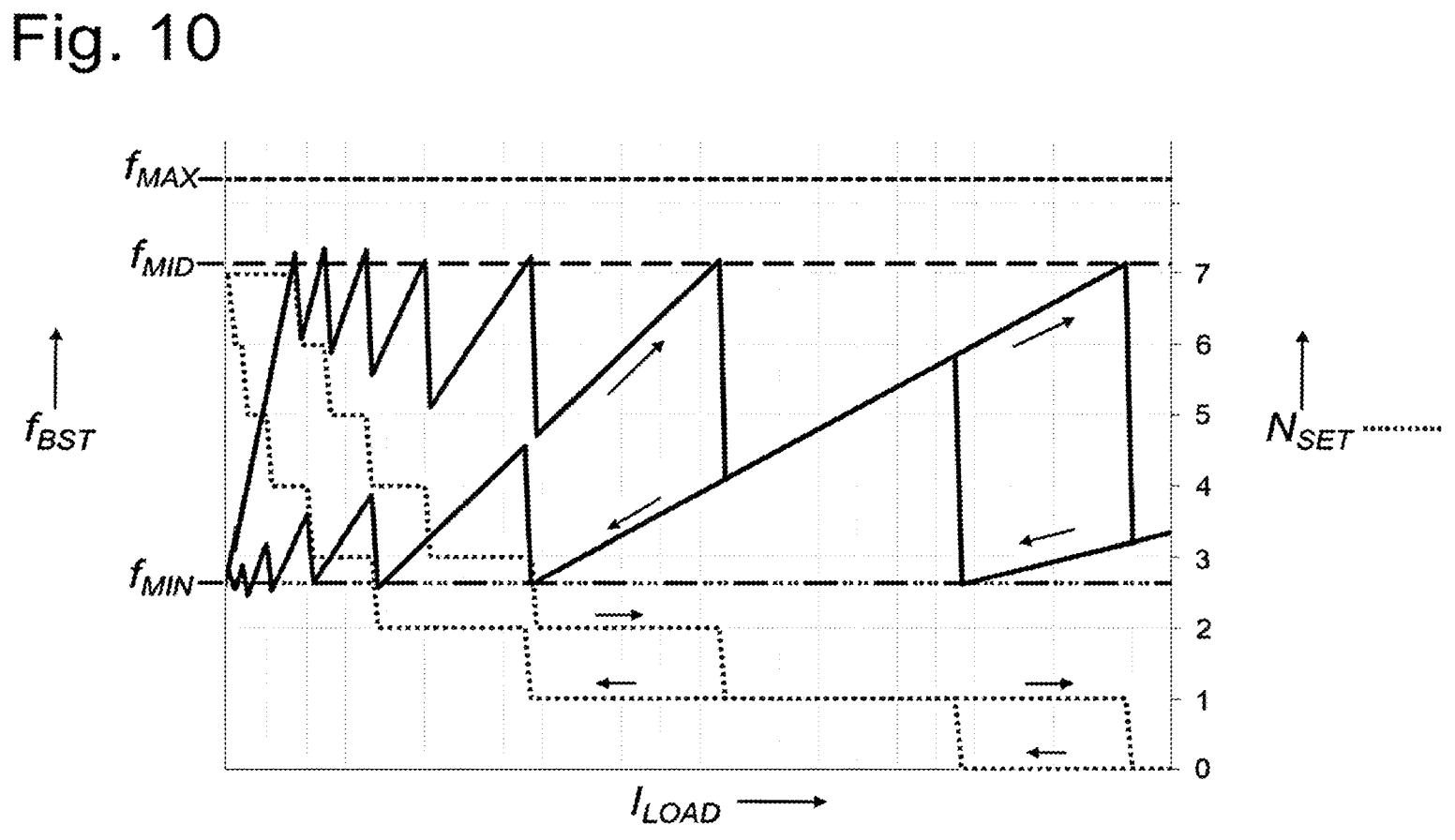

FIG. 10 shows the switching frequency $f_{BST}$, the predetermined minimum frequency $f_{MIN}$, the first predetermined maximum frequency $f_{MAX}$, the second predetermined maximum frequency $f_{MID}$ and the control value $N_{SET}$ as a function of the load current $I_{LOAD}$. In order to avoid toggling between two values of the control value $N_{SET}$, hysteresis is built in by choosing the second predetermined maximum frequency $f_{MID}=2.5*f_{MIN}$ to guarantee that the second predetermined maximum frequency $f_{MID}$ greater than $2.25*f_{MIN}$. This ratio is based on the maximum jump in frequency of a factor 2.25 when going from the control value having a value $N_{SET}=0$ to having a value $N_{SET}=1$. The resulting behavior is shown in FIG. 10. Because of the hysteresis, an increasing load current level will follow a frequency curve limited by the second predetermined maximum frequency $f_{MID}$ whereas a decreasing current will follow a curve limited by the predetermined minimum frequency $f_{MIN}$. The arrows in FIG. 10 indicate what part of the curve is followed when increasing the load current $I_{LOAD}$ or when decreasing the load current $I_{LOAD}$. In this way, hysteresis is used to prevent oscillation.

FIGS. 11A-F show respectively the output voltage $V_{BST}$, the load current $I_{LOAD}$, the switching frequency $f_{BST}$, the inductor current $I_{COIL}$, the control value $N_{SET}$ and the count of the measuring means as a function of time when slowly decreasing the load current. FIGS. 12A-F show respectively the output voltage $V_{BST}$, the load current $I_{LOAD}$, the switching frequency $f_{BST}$, the inductor current $I_{COIL}$, the control value NET and the count of the measuring means as a function of time when slowly decreasing the load current, zoomed in on $N_{SET}$ transition from 2 to 3. In FIGS. 11A-F and 12A-F, the control behavior during a transient with decreasing load current can be seen. Each time the frequency drops down to predetermined minimum frequency $f_{MIN}$, the value of the control value $N_{SET}$ is increased. As a result the peak in the inductor current $I_{COI}$ is decreased and the switching frequency is increased. An additional benefit is that the ripple amplitude on the output voltage $V_{BST}$ reduces.

FIGS. 13A-F show respectively the output voltage $V_{BST}$, the load current $I_{LOAD}$, the switching frequency $f_{BST}$, the inductor current $I_{COIL}$, the control value $N_{SET}$ and the count of the measuring means as a function of time when increasing the load current. FIGS. 14A-F corresponds to FIGS. 13A-F zoomed in on $N_{SET}$ transition from 3 to 2. Each time the second predetermined frequency hits $f_{MID}$, the value of the control value $N_{SET}$ is decreased. As a result the peak in the inductor current $I_{COIL}$ is increased and the switching frequency is decreased. When a high load step is applied, the switching frequency exceeds the predetermined maximum frequency $f_{MAX}$, and the control value $N_{SET}$ goes to zero. This occurs when the boost converter goes out of DCM and enters into CCM.

To illustrate the speed limit of the control method, a stepwise load current change is used as can be seen in FIGS. 15A-F. Because it takes some time to measure the switching frequency after a step down, the switching frequency drops below the first predetermined minimum frequency $f_{MIN}$ for a few periods, but is corrected by increasing the value of $N_{SET}$. After the step-up in the load current, the switching frequency increases to a level above predetermined maximum frequency $f_{MAX}$, and the control value $N_{SET}$ is reset to zero. After this reset action, the control value $N_{SET}$ reaches the original value again.

Figure 16:
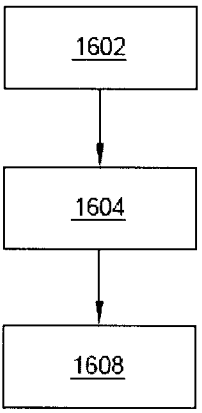
FIG. 16 shows a flowchart of a method of operating a control circuit for a boost converter circuit.

FIG. 16 shows a flowchart of a method of operating a control circuit for a boost converter circuit, wherein the method comprises a first step 1602 comprising switching, by switching means, the boost converter to perform cycles wherein each cycle comprises an energy charging state in which an inductor stores energy provided by an input voltage and an energy discharging state in which the inductor provides energy to an output of the boost converter. In step 1604, the method comprises deciding, by comparison means, whether a frequency of a switching event is lower than a predetermined minimum frequency. Finally, the method proceeds to step 1606 comprising generating, by on-time signal generation means, an on-time signal based on whether a frequency of a switching event is lower than a predetermined minimum frequency, wherein the on-time signal determines a duration of a charging state of a next switching event and wherein the switching means is configured to switch the boost converter based on the generated on-time signal.

The examples and embodiments described herein serve to illustrate rather than limit the disclosures. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single hardware or software item combining the features of the items described.

The invention claimed is:

1. A control circuit for a boost converter, wherein the control circuit comprises:

switching means configured to switch the boost converter to perform cycles wherein each cycle comprises an energy charging state in which an inductor stores energy provided by an input voltage and an energy discharging state in which the inductor provides energy to an output of the boost converter;

comparison means configured to decide whether a frequency of a switching event is lower than a predetermined minimum frequency; and on-time signal generation means configured to generate an on-time signal based on whether the frequency of a switching event is lower than the predetermined minimum frequency, wherein the on-time signal determines a duration of a charging state of a next switching event and wherein the switching means is configured to switch the boost converter based on the generated on-time signal;

wherein the on-time signal generation means comprises a current Digital Analogic Converter (DAC) configured to generate a charge current.

2. The control circuit according to claim 1, wherein the comparison means is further configured to decide whether the frequency of the switching event is higher than a first predetermined maximum frequency and the on-time signal generation means is configured to generate the on-time signal based on whether the frequency of the switching event is higher than the first predetermined maximum frequency;

wherein the on-time signal generation means further comprises a control value configured to decrease when the frequency of the switching event is higher than the first predetermined maximum frequency, and wherein the on-time signal is generated based on the control value.

3. The control circuit according to claim 1, the on-time signal generation means comprises a current source connected to the current DAC and the current source is configured to generate a reference current, wherein the current DAC is configured to generate the charge current based on the control value and the reference current.

4. A control circuit for a boost converter, wherein the control circuit comprises:

switching means configured to switch the boost converter to perform cycles wherein each cycle comprises an energy charging state in which an inductor stores energy provided by an input voltage and an energy discharging state in which the inductor provides energy to an output of the boost converter;

comparison means configured to decide whether a frequency of a switching event is lower than a predetermined minimum frequency; and on-time signal generation means configured to generate an on-time signal based on whether the frequency of a switching event is lower than the predetermined minimum frequency, wherein the on-time signal determines a duration of a charging state of a next switching event and wherein the switching means is configured to switch the boost converter based on the generated on-time signal;

wherein the on-time signal generation means further comprises a control value configured to increase when the frequency of the switching event is lower than the predetermined minimum frequency, and wherein the on-time signal is generated based on the control value.

5. The control circuit according to claim 4, further comprising generating a charge current based on the control value and the current in the inductor.

6. The control circuit according to claim 4, wherein the on-time signal generation means further comprises a register configured to store the control value (NSET), wherein the control value (NSET) is a signal generated by the comparison means at an output and indicates whether the frequency of a switching event is lower than a first threshold, and/or higher than a second threshold and/or higher than a third threshold.

7. The control circuit according to claim 4, wherein the comparison means is further configured to decide whether the frequency of the switching event is higher than a first predetermined maximum frequency and the on-time signal generation means is configured to generate the on-time signal based on whether the frequency of the switching event is higher than the first predetermined maximum frequency;

wherein the on-time signal generation means further comprises a control value configured to decrease when the frequency of the switching event is higher than the first predetermined maximum frequency, and wherein the on-time signal is generated based on the control value.

8. The control circuit according to claim 4, wherein the on-time signal generation means comprises a feedback circuit wherein the feedback circuit comprises a feedback input and is configured to receive a charge current ($I_{CHARGE}$) at the feedback input and to generate the on-time signal based on the charge current.

9. A control circuit for a boost converter, wherein the control circuit comprises:

switching means configured to switch the boost converter to perform cycles wherein each cycle comprises an energy charging state in which an inductor stores energy provided by an input voltage and an energy discharging state in which the inductor provides energy to an output of the boost converter;

comparison means configured to decide whether a frequency of a switching event is lower than a predetermined minimum frequency; and on-time signal generation means configured to generate an on-time signal based on whether the frequency of a switching event is lower than the predetermined minimum frequency, wherein the on-time signal determines a duration of a charging state of a next switching event and wherein the switching means is configured to switch the boost converter based on the generated on-time signal;

measurement means configured to receive a reference clock signal from a reference clock, to count a number of clock cycles during the switching event, and to determine the frequency of the switching event based on the number of clock cycles.

10. The control circuit according to claim 9, wherein the comparison means is further configured to decide whether the frequency of the switching event is higher than a first predetermined maximum frequency and the on-time signal generation means is configured to generate the on-time signal based on whether the frequency of the switching event is higher than the first predetermined maximum frequency;

wherein the on-time signal generation means further comprises a control value configured to decrease when the frequency of the switching event is higher than the first predetermined maximum frequency, and wherein the on-time signal is generated based on the control value.

11. A control circuit for a boost converter, wherein the control circuit comprises:

switching means configured to switch the boost converter to perform cycles wherein each cycle comprises an energy charging state in which an inductor stores energy provided by an input voltage and an energy discharging state in which the inductor provides energy to an output of the boost converter;

comparison means configured to decide whether a frequency of a switching event is lower than a predetermined minimum frequency; and on-time signal generation means configured to generate an on-time signal based on whether the frequency of a switching event is lower than the predetermined minimum frequency, wherein the on-time signal determines a duration of a charging state of a next switching event and wherein the switching means is configured to switch the boost converter based on the generated on-time signal;

wherein the on-time signal generation means comprises a feedback circuit wherein the feedback circuit comprises a feedback input and is configured to receive a charge current ($I_{CHARGE}$) at the feedback input and to generate the on-time signal based on the charge current;

the feedback circuit further comprises a capacitor and comparison circuit wherein the capacitor is configured to store a capacitor voltage based on the charge current, wherein the comparison circuit comprises a first input, a second input, wherein the comparison circuit is configured to receive a reference voltage at the first input, to receive the capacitor voltage at the second input, and to generate the on-time signal by comparing the reference voltage and the capacitor voltage; and the reference voltage is generated by a variable voltage source controlled based on the determined duration of the charging state of the next switching event.

12. The control circuit according to claim 11, wherein the on-time signal generation means is configured to generate the charge current ($I_{CHARGE}$) based on the determined duration of the charging state of the next switching event and a current in the inductor.

13. The control circuit according to claim 11, wherein the charge current ($I_{CHARGE}$) is proportional to an output voltage ($V_{BST}$) of the switching means and the reference voltage ($V_{REF}$) is proportional to ($V_{BST}$–$V_{BAT}$) to obtain a required target frequency in continuous conduction mode (CCM), and $V_{BAT}$ is an input voltage of the switching means.

14. The control circuit according to claim 11, the reference voltage ($V_{REF}$) is scaled based on a control value ($N_{SET}$) by using a variable voltage source, and the on-time signal ($T_{ON}$) is manipulated to scale the capacitor size or to scale the reference voltage ($V_{REF}$) with 1/factor.

15. A control circuit for a boost converter, wherein the control circuit comprises:

switching means configured to switch the boost converter to perform cycles wherein each cycle comprises an energy charging state in which an inductor stores energy provided by an input voltage and an energy discharging state in which the inductor provides energy to an output of the boost converter;

comparison means configured to decide whether a frequency of a switching event is lower than a predetermined minimum frequency; and on-time signal generation means configured to generate an on-time signal based on whether the frequency of a switching event is lower than the predetermined minimum frequency, wherein the on-time signal determines a duration of a charging state of a next switching event and wherein the switching means is configured to switch the boost converter based on the generated on-time signal;

wherein the on-time signal generation means comprises a feedback circuit wherein the feedback circuit comprises a feedback input and is configured to receive a charge current ($I_{CHARGE}$) at the feedback input and to generate the on-time signal based on the charge current;

the feedback circuit further comprises a capacitor and comparison circuit wherein the capacitor is configured to store a capacitor voltage based on the charge current, wherein the comparison circuit comprises a first input, a second input, wherein the comparison circuit is configured to receive a reference voltage at the first input, to receive the capacitor voltage at the second input, and to generate the on-time signal by comparing the reference voltage and the capacitor voltage; and the capacitor comprises variable capacitor controlled based on the determined duration of the charging state of the next switching event.

16. The control circuit according to claim 15, wherein the on-time signal generation means is configured to generate the charge current ($I_{CHARGE}$) based on the determined duration of the charging state of the next switching event and a current in the inductor.

17. The control circuit according to claim 15, wherein the charge current ($I_{CHARGE}$) is proportional to an output voltage ($V_{BST}$) of the switching means and the reference voltage ($V_{REF}$) is proportional to ($V_{BST}$–$V_{BAT}$) to obtain a required target frequency in continuous conduction mode (CCM), and $V_{BAT}$ is an input voltage of the switching means.

18. The control circuit according to claim 15, the reference voltage ($V_{REF}$) is scaled based on a control value ($N_{SET}$) by using a variable voltage source, and the on-time signal ($T_{ON}$) is manipulated to scale the capacitor size or to scale the reference voltage ($V_{REF}$) with 1/factor.

19. A control circuit for a boost converter, wherein the control circuit comprises:

switching means configured to switch the boost converter to perform cycles wherein each cycle comprises an energy charging state in which an inductor stores energy provided by an input voltage and an energy discharging state in which the inductor provides energy to an output of the boost converter;

comparison means configured to decide whether a frequency of a switching event is lower than a predetermined minimum frequency; and on-time signal generation means configured to generate an on-time signal based on whether the frequency of a switching event is lower than the predetermined minimum frequency, wherein the on-time signal determines a duration of a charging state of a next switching event and wherein the switching means is configured to switch the boost converter based on the generated on-time signal;

wherein the comparison means is further configured to decide whether the frequency of the switching event is higher than a first predetermined maximum frequency and the on-time signal generation means is configured to generate the on-time signal based on whether the frequency of the switching event is higher than the first predetermined maximum frequency;

the comparison means is further configured to decide whether the frequency of the switching event is higher than a predetermined second maximum frequency and the on-time signal generation means is configured to generate the on-time signal based further on whether the frequency of the switching event is higher than the predetermined second maximum frequency;

wherein the second predetermined frequency is greater than 2.25 multiply by the first predetermined frequency;

wherein the on-time signal generation means further comprises a control value configured to reset when the frequency of the switching event is higher than the second predetermined maximum frequency, and wherein the on-time signal is generated based on the control value.

20. The control circuit according to claim 19, wherein the on-time signal generation means further comprises a control value configured to decrease when the frequency of the switching event is higher than the first predetermined maximum frequency, and wherein the on-time signal is generated based on the control value.

* * * * *